(12) United States Patent
Kondo

(10) Patent No.: US 7,114,472 B2
(45) Date of Patent: Oct. 3, 2006

(54) ELECTROMAGNETIC VALVE

(75) Inventor: Jiro Kondo, Kariya (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 11/157,904

(22) Filed: Jun. 22, 2005

(65) Prior Publication Data
US 2006/0000994 A1    Jan. 5, 2006

(30) Foreign Application Priority Data
Jun. 30, 2004   (JP)   ............... 2004-194254

(51) Int. Cl.
*F01L 1/34* (2006.01)
(52) U.S. Cl. ............... 123/90.17; 123/90.15; 251/129.15; 251/129.22
(58) Field of Classification Search ............ 123/90.17, 123/90.15, 90.31; 251/129.15, 129.22, 129.01
See application file for complete search history.

(56) References Cited

U.S. PATENT DOCUMENTS

2001/0048090 A1 * 12/2001 Kobayashi et al. .... 251/129.15

FOREIGN PATENT DOCUMENTS

| JP | 2001-108135 | 4/2001 |
|---|---|---|
| JP | 2003-97756 | 4/2003 |

* cited by examiner

*Primary Examiner*—Thomas Denion
*Assistant Examiner*—Zelalem Eshete
(74) *Attorney, Agent, or Firm*—Nixon & Vanderhye PC

(57) ABSTRACT

A shaft is press-fit into the valve member or the plunger of an electromagnetic valve to transmit the axial movement of the plunger to the valve member. A diameter reducing mechanism is provided for reducing the diameter of at least the press-fit portion of the shaft so that the diameter of the shaft is decreased by a press-fitting force applied to the shaft by the valve member and/or plunger. Deformation due to the press-fitting process is absorbed by the shaft, so deformation of the valve member and/or plunger is inhibited. Accordingly, it is unnecessary to give a large margin to a plunger side air gap, and magnetic efficiency can be improved. Also, two chambers on both axial sides of the plunger can communicate with each other through a clearance provided by the C-shaped cross-section, an inner hole and a penetration hole of the shaft. Therefore, it is unnecessary to form any separate groove or hole in the plunger for respiration.

16 Claims, 3 Drawing Sheets

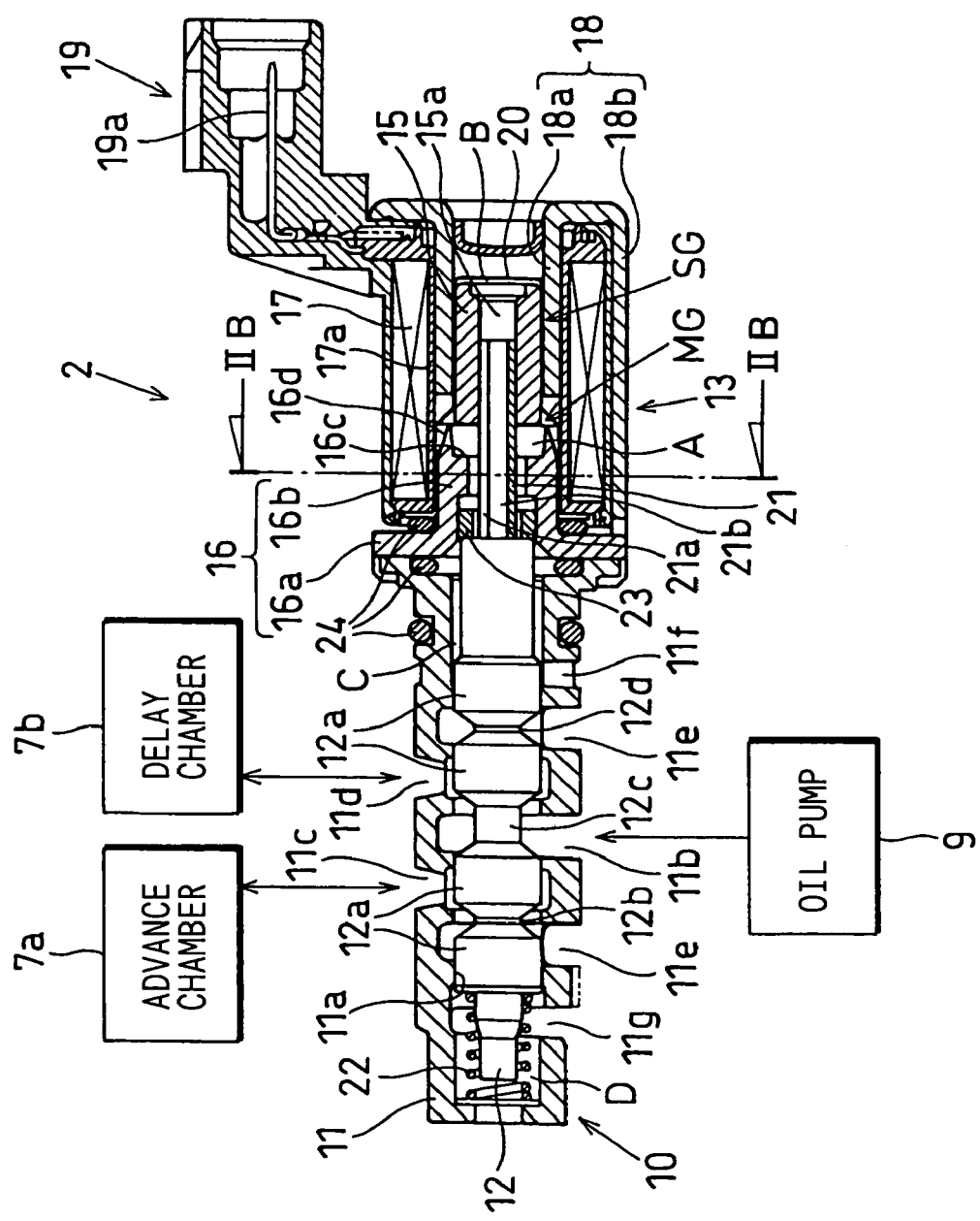
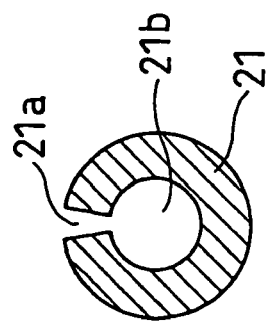

ELECTROMAGNETIC VALVE

CROSS REFERENCE TO RELATED APPLICATION

This application is based on and incorporates herein by reference Japanese Patent Application No. 2004-194254 filed on Jun. 30, 2004.

BACKGROUND OF THE INVENTION

1. Field of the Invention

The present invention relates to an electromagnetic valve that drives a valve device by operating an electromagnetic actuator. Specifically, the present invention relates to a technology suitably applicable to an oil flow control valve (OCV) that alters a flow of oil by operating the electromagnetic actuator.

2. Description of Related Art

An oil flow control valve (OCV) is an oil pressure control valve having a spool valve (valve device) and an electromagnetic actuator. The OCV operates the electromagnetic actuator to displace a plunger in an axial direction against a biasing force of a return spring. The OCV transmits the displacement of the plunger to a spool (valve member) to displace the spool in the axial direction. Thus, the OCV switches input and output ports formed in a sleeve to control destination or intensity of an oil pressure to be supplied.

A shaft is used to transmit the axial displacement of the plunger to the spool and to transmit the axial displacement of the spool to the plunger.

In some cases, the shaft is press-fit into at least one of the spool and the plunger as disclosed, for example, in JP-A-2001-108135.

The plunger is deformed, e.g., a diameter thereof is enlarged, if the shaft is press-fit into the plunger. Therefore, an air gap, e.g., side air gap, between the plunger and a magnetic circuit, e.g., yoke, around the plunger should have some margin in consideration of the deformation (the diameter enlargement) of the plunger. Accordingly, a magnetic efficiency at the air gap decreases. Therefore, a coil for generating a magnetic force needs to be enlarged in size.

The spool is deformed if the shaft is press-fit into the spool. There is a possibility that the deformation may be transmitted to a large diameter portion (land) of the spool. A sealing portion for preventing passage of the oil is provided between the large diameter portion and the sleeve. Therefore, a clearance between the large diameter portion and the sleeve needs to be set small. However, the clearance between the large diameter portion and the sleeve needs to have some margin in consideration of the deformation (the diameter enlargement) of the large diameter portion if the deformation caused by press-fitting process is transmitted to the large diameter portion. A quantity of oil leaking through the clearance between the large diameter portion and the sleeve will increase if the clearance has a large margin.

In the case where a through hole is formed in the center of the plunger and the shaft is press-fit into the through hole, the shaft blocks the through hole. In this case, a separate respiration passage is necessary for connecting the chambers (volume changing chambers) provided on both axial sides of the plunger.

A helical groove may be formed on an outer peripheral surface of the plunger to define the respiration passage. However, a magnetic resistance is enlarged at the helical groove, so the magnetic efficiency will be deteriorated. In addition, the helical groove on the outer peripheral surface requires a complicated manufacturing process, so the cost will be increased.

SUMMARY OF THE INVENTION

It is therefore an object of the present invention to provide an electromagnetic valve capable of preventing deformation of a plunger and a valve member such as a spool even though a shaft is press-fit into at least one of the plunger and the valve member.

According to an aspect of the present invention, a shaft of an electromagnetic valve includes a diameter reducing mechanism, which is provided at least at a press-fit portion thereof, for reducing a diameter thereof with the use of a press-fitting force applied thereto in a direction from an outer peripheral surface toward an inside thereof.

Therefore, in the case where the shaft is press-fit into a plunger, deformation due to the press-fitting process is absorbed by the diameter reduction of the shaft. Accordingly, deformation of the plunger can be inhibited. Thus, it is unnecessary to give a large margin to an air gap around the plunger and a magnetic efficiency at the air gap can be improved. As a result, a magnetic force applied to the plunger is increased, and a coil for generating the magnetic force can be reduced in size.

In the case where the shaft is press-fit into a valve member, deformation due to the press-fitting process is absorbed by the reduction of the diameter of the shaft. Thus, the deformation of the valve member can be inhibited. For instance, in the case where the shaft is press-fit into a spool, the deformation caused by press-fitting the shaft is absorbed by the reduction of the diameter of the shaft. Accordingly, deformation of the spool is inhibited and a problem of transmission of the deformation of the spool to a large diameter portion (land) of the spool can be prevented. Thus, it is unnecessary to give a large margin to a clearance between the large diameter portion and the sleeve, and a quantity of oil leaking through the clearance between the large diameter portion and the sleeve can be suppressed.

BRIEF DESCRIPTION OF THE DRAWINGS

Features and advantages of embodiments of the invention will be appreciated, as well as methods of operation and the function of the related parts, from a study of the following detailed description, the appended claims, and the drawings, all of which form a part of this application. In the drawings:

FIG. 2A is a longitudinal cross-sectional view showing an oil flow control valve according to the first embodiment;

FIG. 2B is a cross-sectional view showing a shaft of the oil flow control valve of FIG. 2A along the direction IIB;

DETAILED DESCRIPTION OF THE PREFERRED EMBODIMENTS

Figure 1:
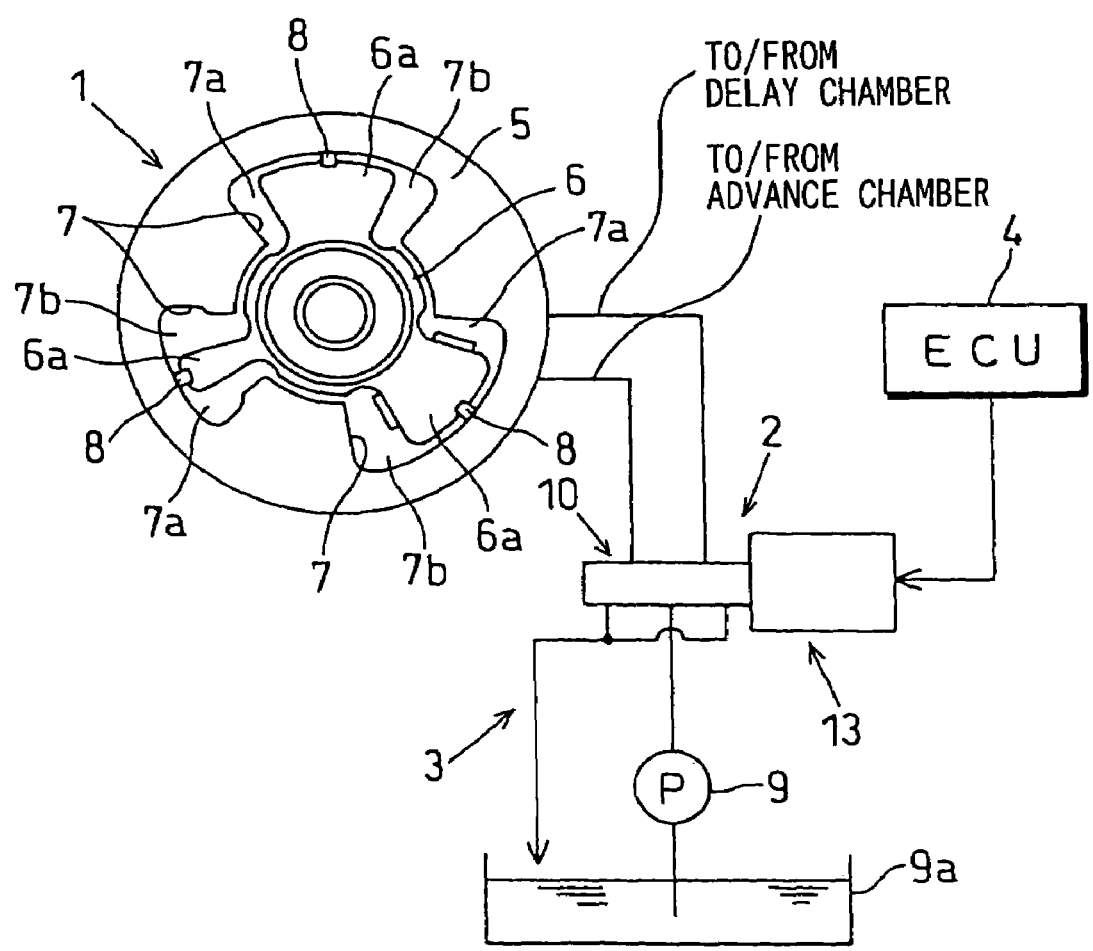
FIG. 1 is a schematic diagram showing a variable valve timing device according to a first embodiment of the present invention.

Referring to FIG. 1, a variable valve timing device (VVT) according to a first example embodiment of the present invention is illustrated.

The VVT shown in FIG. 1 is attached to a camshaft (either one of an intake valve camshaft, an exhaust valve camshaft and an intake-exhaust valve camshaft) of an internal combustion engine. The VVT can continuously vary opening-closing timing of a valve.

The VVT includes a variable cam timing mechanism (VCT) 1, an oil pressure circuit 3 including an oil flow control valve (OCV) 2, and an electronic control unit (ECU) 4 for controlling the OCV 2.

The VCT 1 includes a shoe housing (rotary driving member) 5 and a vane rotor (rotary driven member) 6. The shoe housing 5 is driven to rotate in synchronization with a crankshaft of the engine. The vane rotor 6 is provided to rotate relative to the shoe housing 5 and to rotate together with the camshaft. An oil pressure actuator provided in the shoe housing 5 drives and rotates the vane rotor 6 with respect to the shoe housing 5 to change the camshaft to an advance side or a delay side.

The shoe housing 5 is joined to a sprocket through bolts or the like. The sprocket is driven and rotated by the crankshaft of the engine through a timing belt, a timing chain or the like. The shoe housing 5 rotates together with the sprocket. Multiple (three in the present embodiment) concave portions 7 substantially in the shape of fans are formed in the shoe housing 5 as shown in FIG. 1. The shoe housing 5 rotates clockwise in FIG. 1. An advance direction coincides with this clockwise rotational direction.

The vane rotor 6 is positioned at an end of the camshaft by a positioning pin or the like. The vane rotor 6 is fixed to the end of the camshaft by a bolt or the like so that the vane rotor 6 rotates together with the camshaft, as mentioned above.

The vane rotor 6 has vanes 6a for partitioning the concave portions 7 of the shoe housing 5 into advance chambers 7a and delay chambers 7b. The vane rotor 6 is provided so that the vane rotor 6 can rotate within a predetermined angle with respect to the shoe housing 5.

The advance chamber 7a is an oil pressure chamber for driving the vane 6a toward the advance side by the oil pressure. The advance chamber 7a is formed in the concave portion 7 on a side of the vane 6a opposite to the direction of the rotation. The delay chamber 7b is an oil pressure chamber for driving the vane 6a to the delay side by the oil pressure. Sealing members 8 and the like ensure fluid-tightness inside the respective chambers 7a, 7b.

The oil pressure circuit 3 supplies/drains the oil to/from the advance chambers 7a and the delay chambers 7b. Thus, the oil pressure circuit 3 generates an oil pressure difference between the advance chambers 7a and the delay chambers 7b to cause the relative rotation of the vane rotor 6 with respect to the shoe housing 5. The oil pressure circuit 3 includes an oil pump 9 and the OCV (electromagnetic valve) 2. The oil pump 9 is driven by the crankshaft and the like. The OCV 2 supplies the oil (the oil pressure), which is pressure-fed by the oil pump 9, to the advance chambers 7a or the delay chambers 7b in a switching manner, and adjusts the oil pressure supplied to the advance chambers 7a or the delay chambers 7b.

The OCV 2 includes a spool valve (valve device) 10 and an electromagnetic actuator 13. The spool valve 10 includes a sleeve 11 and a spool (valve member) 12. The electromagnetic actuator 13 drives the spool 12 in the axial direction.

The sleeve 11 is formed substantially in the shape of a cylinder with multiple inlet and outlet ports. More specifically, the sleeve 11 is formed with an insertion hole 11a, an oil pressure supply port 11b, an advance chamber communication port 11c, a delay chamber communication port 11d and drain ports 11e. The insertion hole 11a holds the spool 12 so that the spool 12 can freely slide in the axial direction. The oil pressure supply port 11b communicates with an oil discharge hole of the oil pump 9. The advance chamber communication port 11c communicates with the advance chambers 7a. The delay chamber communication port 11d communicates with the delay chambers 7b. The drain ports 11e return the oil into an oil pan 9a.

The oil pressure supply port 11b, the advance chamber communication port 11c, the delay chamber communication port 11d and the drain ports 11e are holes formed in a side surface of the sleeve 11. One of the drain ports 11e, the advance chamber communication port 11c, the oil pressure supply port 11b, the delay chamber communication port 11d and the other drain port 11e are disposed in that order from the left side (side opposite from a coil) to the right side (coil side) of FIG. 2A.

The spool 12 has four large diameter portions (lands) 12a. An external diameter of each land 12a is slightly smaller than an internal diameter of the sleeve 11 (diameter of the insertion hole 11a). A difference (clearance) between the internal diameter of the sleeve 11 and the external diameter of the large diameter portion 12a allows the sliding motion of the spool 12, while preventing oil from leaking through the clearance.

An advance chamber draining small diameter portion 12b, an oil pressure supply small diameter portion 12c and a delay chamber draining small diameter portion 12d are formed between the large diameter portions 12a in order to change communication states of the multiple inlet-outlet ports 11b–11e in accordance with the axial position of the spool 12.

The advance chamber draining small diameter portion 12b discharges oil from the advance chambers 7a when oil is supplied to the delay chambers 7b. The oil pressure supply small diameter portion 12c supplies oil to the advance chambers 7a or the delay chambers 7b. The delay chamber draining small diameter portion 12d discharges oil from the delay chambers 7b when oil is supplied to the advance chambers 7a.

The electromagnetic actuator 13 includes a plunger 15, a stator 16, a coil 17, a yoke 18 and a connector 19.

The plunger 15 is formed by a magnetic metal (ferromagnetic material such as iron) magnetically attracted by the stator 16. The plunger 15 is held inside the stator 16 (more specifically, inside a cup guide 20 for oil sealing) so that the plunger 15 can slide in the axial direction.

The stator 16 is a magnetic metal (ferromagnetic material such as iron) including a disc portion 16a and a cylindrical portion 16b. The disc portion 16a is interposed between the sleeve 11 and the coil 17. The cylindrical portion 16b conducts a magnetic flux of the disc portion 16a to a vicinity of the plunger 15. A main air gap (magnetic attraction gap) MG is formed between the plunger 15 and the cylindrical portion 16b.

A concave portion 16c is formed in an end of the cylindrical portion 16b. An end of the plunger 15 is inserted into the concave portion 16c so that the end of the plunger 15 does not contact the concave portion 16c. The concave portion 16c is formed so that a portion of the plunger 15 and a portion of the stator 16 overlap with respect to the axial direction. A tapered portion 16d is formed on the end of the cylindrical portion 16b so that the magnetic attraction does not change with respect to a stroke amount of the plunger 15.

The coil 17 is a magnetic force generating device for generating a magnetic force to magnetically attract the plunger 15 to the stator 16 when energized. The coil 17 is formed by winding a lead wire, e.g., an enamel wire, which is covered by an insulating coating, around a plastic bobbin 17*a* multiple times.

The yoke 18 is magnetic metal (ferromagnetic metal such as iron) including an inner cylinder portion 18*a*, which surrounds a periphery of the plunger 15, and an outer cylinder portion 18*b*, which surrounds a periphery of the coil 17. The yoke 18 is engaged with the sleeve 11 by crimping a claw portion formed on a left side thereof in FIG. 2A. The inner cylinder portion 18*a* exchanges the magnetic flux with the plunger 15. A side air gap (magnetic flux exchange gap) SG is formed between the plunger 15 and the inner cylinder portion 18*a*.

The connector 19 electrically connects the coil 17 with the ECU 4 through connection wires. Terminals 19*a* provided inside the connector 19 are connected to both ends of the coil 17.

The OCV 2 includes a shaft 21 and a return spring 22. The shaft 21 transmits the leftward movement of the plunger 15 in FIG. 2A to the spool 12 and transmits the rightward movement of the spool 12 in FIG. 2A to the plunger 15. The return spring 22 biases the spool 12 and the plunger 15 to a direction (to the rightward direction in FIG. 2A) in which the plunger 15 and the stator 16 separate from each other.

The shaft 21 is disposed in the disc portion 16*a* of the stator 16. The shaft 21 is held by an inner peripheral surface of a cylindrical stopper 23 so that the shaft 21 can freely slide in the axial direction.

One end of the shaft 21 contacts an axial end of the spool 12 and the other end of the shaft 21 is press-fit into the plunger 15.

The return spring 22 is disposed at an end of the spool 12 on a side opposite from the coil 17 (on the left side in FIG. 2A) to bias the spool 12 rightward in FIG. 2A. The return spring 22 may be positioned at other places. For instance, the return spring 22 may be interposed between the stator 16 and the plunger 15 to bias the plunger 15 rightward in FIG. 2A in the case where the spool 12 and the plunger 15 are fixed to the shaft 21.

In the OCV 2, the spool 12 and the plunger 15 are moved toward the coil 17 (rightward in FIG. 2A) by the biasing force of the return spring 22 when the coil 17 is de-energized and then stop.

In this stopped state, the maximum value of the main air gap MG is determined and the position of the spool 12 with respect to the sleeve 11 is determined. O-rings 24 are shown in FIG. 2A.

The plunger 15 moves axially inside the electromagnetic actuator 13. Therefore, volume changing chambers, of which volumes change in accordance with the movement of the plunger 15, are provided on both sides of the plunger 15 in the axial direction.

The volume changing chamber on the stator 16 side (the left side in FIG. 2A) of the plunger 15 is referred to as a first volume changing chamber A. The other volume changing chamber on a side opposite from the stator 16 (the right side in FIG. 2A) of the plunger 15 is referred to as a second volume changing chamber B.

The first volume changing chamber A and the second volume changing chamber B communicate with each other through a respiration passage.

The spool 12 also moves axially inside the sleeve 11. Therefore, volume changing chambers, whose volumes change in accordance with the movement of the spool 12, are provided on both sides of the spool 12 in the axial direction. The volume changing chamber on the electromagnetic actuator 13 side (the right side in FIG. 2A) of the spool 12 is referred to as a third volume changing chamber C. The volume changing chamber on a side of the spool 12 opposite from the electromagnetic actuator 13 is referred to as a fourth volume changing chamber D.

The sleeve 11 is formed with a first respiration hole 11*f*, which communicates with the third volume changing chamber C, and a second respiration hole 11*g*, which communicates with the fourth volume changing chamber D.

The first and second respiration holes 11*f*, 11*g* are oil passages communicating with an exterior oil passage (oil passage communicating with the drain port 11*e*) for returning the oil to the oil pan 9*a*. The oil is supplied to or drained from the third and fourth volume changing chambers C, D through the first and second respiration holes 11*f*, 11*g* respectively if the spool 12 moves in the axial direction.

The third volume changing chamber C communicates with the first volume changing chamber A or the second volume changing chamber B through a communication mechanism (not shown). The communication mechanism is provided by a groove or a hole formed in the stopper 23 or a respiration groove formed on a surface of the spool 12, against which the shaft 21 strikes, for instance. The oil is supplied from the third volume changing chamber C into the first volume changing chamber A or the second volume changing chamber B or the oil is drained from the first volume changing chamber A or the second volume changing chamber B to the third volume changing chamber C.

The ECU 4 controls a current (current supply amount) supplied to the coil 17 by duty ratio control. Thus, the ECU 4 controls the axial position of the spool 12 linearly. Accordingly, the ECU 4 generates the operational oil pressure in the advance chambers 7*a* and the delay chambers 7*b* in accordance with the operating state of the engine to control the advance phase of the camshaft.

The ECU 4 increases the current amount supplied to the coil 17 when the ECU 4 advances the camshaft in accordance with the operating state of the vehicle. Thus, the magnetic force generated by the coil 17 increases and the plunger 15 and the spool 12 move toward the side opposite from the coil 17 (leftward in FIG. 2A or toward the advance side). Accordingly, a communication ratio between the oil pressure supply port 11*b* and the advance chamber communication port 11*c* increases and a communication ratio between the delay chamber communication port 11*d* and the drain port 11*e* increases. As a result, oil pressure in the advance chambers 7*a* increases, and oil pressure in the delay chambers 7*b* decreases. Accordingly, the vane rotor 6 moves toward the advance side with respect to the shoe housing 5, and the camshaft is advanced.

The ECU 4 decreases the current amount supplied to the coil 17 when the ECU 4 delays the camshaft in accordance with the operating state of the vehicle. Thus, the magnetic force generated by the coil 17 decreases and the plunger 15 and the spool 12 move toward the coil 17 (rightward in FIG. 2A or toward the delay side). Accordingly, a communication ratio between the oil pressure supply port 11*b* and the delay chamber communication port 11*d* increases and a communication ratio between the advance chamber communication port 11*c* and the drain port 11*e* increases. As a result, oil pressure in the delay chambers 7*b* increases, and oil pressure in the advance chambers 7*a* decreases. Accordingly, the vane rotor 6 moves toward the delay side with respect to the shoe housing 5, and the camshaft is delayed.

At least the press-fit portion of the shaft 21 has a diameter reducing mechanism for reducing the shaft diameter by a press-fitting force, which is applied to the shaft 21 by the plunger 15 in a direction from the outer peripheral surface to the inner peripheral surface of the shaft 21 when the shaft 21 is press-fit into the plunger 15.

In the illustrated embodiment, the diameter reducing mechanism is provided by forming at least the press-fit portion of the shaft 21 in the shape of a cylinder, of which a cross-section is formed in a C-shape as shown in FIG. 2B. Thus, the diameter of the shaft 21 is reduced by resilient deformation or plastic deformation caused by the press-fitting force, which is applied by the plunger 15 inward in the radial direction. The rigidity of the shaft 21 and a press-fitting margin thereof fit into the plunger 15 are set so that the shaft 21 can absorb the deformation due to the press-fitting process and the external diameter of the plunger 15 does not change. Meanwhile, the rigidity and the press-fitting margin are set so that the fixed state between the plunger 15 and the shaft 21 can be surely maintained even if the shaft 21 receives axial forces from the spool 12 and the plunger 15.

Thus, the plunger 15 is not deformed (the diameter thereof is not increased) even if the shaft 21 is press-fit into the through hole 15a of the plunger 15. Accordingly, it is not necessary to give a large margin to the side air gap SG, so the side air gap SG can be set suitably narrow. As a result, the magnetic efficiency at the side air gap can be improved.

By improving the magnetic efficiency at the side air gap SG, the magnetic force applied to the plunger 15 is increased. Therefore, the coil 17 generating the magnetic force can be reduced in size. As a result, the electromagnetic actuator 13 can be reduced in weight and size.

In the embodiment illustrated in FIGS. 2A and 2B, the shaft 21 is formed as a C-shaped cylinder along its entire length. It is to be understood, however, that if deemed necessary or desirable, the diameter reducing configuration or mechanism can be limited to the part of the shaft 21 that is press-fit into the plunger 15.

The shaft 21 is formed with a clearance (opening) 21a and an inner hole 21b extending in the axial direction because the shaft 21 is formed, along at least part of the length thereof, in the shape of the cylinder having a C-shaped cross-section. The clearance 21a and the inner hole 21b of the cylinder body of the shaft 21 provide a part of the respiration passage.

The first volume changing chamber A and the second volume changing chamber B communicate with each other through the respiration passage provided by the clearance 21a, the inner hole 21b and the through hole 15a. Therefore, it is unnecessary to form a respiration groove or a respiration hole in the plunger 15 other than the through hole 15a into which the shaft 21 is press-fit. Therefore, an increase of the cost of the plunger 15 can be avoided, and the cost of the OCV 2 can be suppressed.

Next, an oil flow control valve (OCV) 2 according to a second example embodiment of the present invention will be explained based on FIGS. 3A and 3B.

Figure 3A:
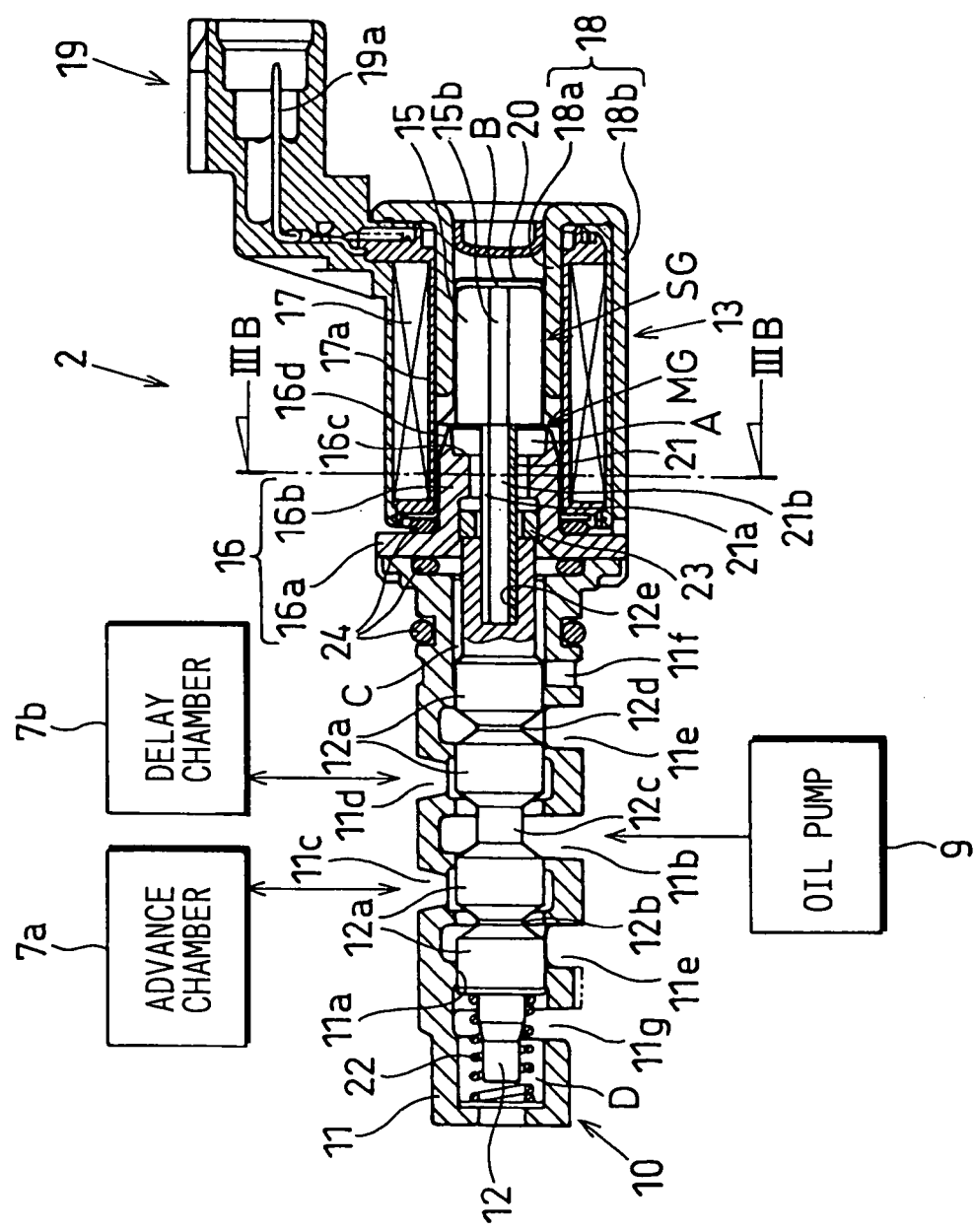
FIG. 3A is a longitudinal cross-sectional view showing an oil flow control valve according to a second embodiment of the present invention.

In the OCV 2 according to the second embodiment, the shaft 21 is press-fit into a press-fitting hole 12e formed in the center of the end of the spool 12 on the coil 17 side (the right side in FIG. 3A)

As in the first embodiment, the shaft 21 of the second embodiment includes a diameter reducing mechanism. The diameter reducing mechanism reduces the diameter of the shaft 21 by the press-fitting force applied along a direction from the outer peripheral surface to the inside thereof.

The diameter reducing mechanism of the second embodiment is provided by forming at least the press-fit portion of the shaft 21 in the shape of a cylinder, which has a cross-section formed substantially in a C-shape. Thus, the diameter of the shaft 21 is reduced by the press-fitting force, which is applied from the spool 12 to the shaft 21 inward in the radial direction. The rigidity of the shaft 21 and a press-fitting margin thereof fit into the spool 12 are set so that the shaft 21 can absorb the deformation due to the press-fitting process and so that the spool 12 does not change. Meanwhile, the rigidity and the press-fitting margin are set so that the fixed state between the spool 12 and the shaft 21 can be surely maintained even if the shaft 21 receives an axial force from the spool 12 and the plunger 15.

Thus, even if the shaft 21 is press-fit into the spool 12, the deformation due to the press-fitting process is absorbed by the reduction of the diameter of the shaft 21. Accordingly, the spool 12 is not deformed and a problem of the transmission of the deformation of the spool 12 to the large diameter portions 12a can be prevented. Therefore, it is unnecessary to give a large margin to the clearance between the large diameter portions 12a and the sleeve 11, so the clearance can be set suitably narrow. As a result, the oil leak quantity from the clearance between the large diameter portions 12a and the sleeve 11 can be inhibited and the oil leak inhibition performance of the OCV 2 can be improved.

Figure 3B:
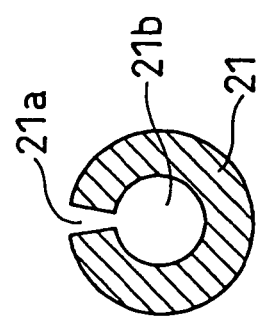
FIG. 3B is a cross-sectional view showing a shaft of the oil flow control valve of FIG. 3A along the direction IIIB.

In the embodiment illustrated in FIGS. 3A and 3B, the shaft 21 is formed as a C-shaped cylinder along its entire length. It is to be understood, however, that if deemed necessary or desirable, the diameter reducing configuration or mechanism can be limited to the part of the shaft 21 that is press-fit into spool 12.

A respiration hole 15b is formed in the center of the plunger 15 of the second embodiment so that the respiration hole 15b penetrates the plunger 15 in the axial direction. The first volume changing chamber A and the second volume changing chamber B communicate with each other through a respiration passage, which is provided by the clearance 21a provided by the C-shaped section, the inner hole 21b and the respiration hole 15b.

Any other structure of the VCT 1 may be employed if the structure can perform the advance adjustment by the oil pressure actuator in the VCT 1.

For instance, at least one concave portion 7 and at least one vane 6a are necessary. Therefore, the number of the concave portions 7 or the vanes 6a is not limited to three as in the above embodiments.

In the above embodiments, the shoe housing 5 rotates in synchronization with the crankshaft, and the vane rotor 6 rotates together with the camshaft. Alternatively, the vane rotor 6 may rotate in synchronization with the crankshaft, and the shoe housing 5 may rotate together with the camshaft.

In the above embodiments, a spool 12 having the large diameter portions 12a and the small diameter portions 12b–12d is used. Alternatively, a cylindrical spool may be used.

In the above embodiments, the input and output ports (the oil pressure supply port 11b, the advance chamber communication port 11c, the delay chamber communication port 11d and the like) are provided by forming holes in the side surface of the sleeve 11. Alternatively, multiple input and output ports may be provided by forming penetration holes in the sleeve 11 along directions of diameters thereof.

A structure of the electromagnetic actuator 13, in which the plunger 15 is aligned with the coil 17 along the axial direction, may be employed.

In the above embodiments, the spool 12 moves toward the side opposite from the coil 17 when the coil 17 is energized.

Alternatively, the spool 12 may move toward the coil 17 when the coil 17 is energized.

In addition, a respiration hole penetrating the inside of the spool 12 in the axial direction may be formed and the respiration hole may communicate with the respiration hole formed in the end of the sleeve 11.

In the above embodiments, the present invention is applied to the OCV 2 combined with the VCT 1. The present invention can also be applied to any kind of OCV that intermittently passes oil or changes the flow direction of oil such as an OCV used in an oil pressure control device of an automatic transmission.

In the above embodiments, the present invention is applied to the OCV 2 that switches and adjusts oil pressure. The present invention can also be applied to other types of electromagnetic valves, e.g., a switching electromagnetic valve for a gas or air and a switching electromagnetic valve for water or liquid fuel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An electromagnetic valve comprising:
   a valve device including a valve member capable of moving in an axial direction;
   an electromagnetic actuator including a coil, which generates a magnetic force when energized, a plunger, which moves in the axial direction, and a stator for leading the magnetic force generated by the coil to the plunger;
   a shaft press-fit into at least one of the valve member and the plunger for transmitting the axial movement of the plunger to the valve member and for transmitting the axial movement of the valve member to the plunger; and
   a diameter reducing mechanism provided at least in a press-fit portion of the shaft for reducing a diameter of the shaft with the use of a press-fitting force applied to the shaft along a direction from an outer peripheral surface to an inside of the shaft.

2. The electromagnetic valve as in claim 1, wherein at least the press-fit portion of the shaft is a generally cylindrical body having at least one longitudinal slit.

3. The electromagnetic valve as in claim 2, wherein at least the press-fit portion of the shaft has a substantially C-shaped cross-section.

4. The electromagnetic valve as in claim 1, wherein the shaft is cylindrical with a substantially C-shaped cross-section along an entire length thereof.

5. The electromagnetic valve as in claim 1, wherein the valve device is a spool valve including a sleeve, which is formed with an inlet port and an outlet port for fluid, and a spool, which is held inside the sleeve so that the spool can freely move in the axial direction in a sliding manner to switch the inlet and outlet ports, wherein the spool valve and the electromagnetic actuator constitute an oil flow control valve.

6. The electromagnetic valve as in claim 5, wherein the oil flow control valve includes a rotary driving member, which is driven to rotate in synchronization with a crankshaft of an internal combustion engine, and a rotary driven member, which rotates with respect to the rotary driving member and rotates together with a camshaft of the engine,
   the oil flow control valve is combined with a variable valve timing mechanism, which moves the rotary driven member and the camshaft to an advance side with respect to the rotary driving member by supplying oil to an advance chamber formed between the rotary driving member and the rotary driven member, and moves the rotary driven member and the camshaft toward a delay side with respect to the rotary driving member by supplying oil to a delay chamber formed between the rotary driving member and the rotary driven member, and
   the oil flow control valve supplies oil pressure generated by an oil pressure source into the advance chamber and drains oil from the delay chamber or supplies oil pressure generated by the oil pressure source into the delay chamber and drains oil from the advance chamber during operation of the engine.

7. The electromagnetic valve as in claim 1, wherein the shaft is inserted into a bore in the valve member.

8. The electromagnetic valve as in claim 7, wherein at least the press-fit portion of the shaft is a cylindrical body having a substantially C-shaped cross-section.

9. The electromagnetic valve as in claim 8, wherein an inner hole is defined axially of the shaft,
   the substantially C-shaped cross section of the shaft defines a clearance opening, and
   said inner hole and said clearance opening define at least a part of a respiration passage connecting two chambers provided on both axial sides of the plunger.

10. The electromagnetic valve as in claim 1, wherein the shaft is inserted into a bore in the plunger.

11. The electromagnetic valve as in claim 10, wherein at least the press-fit portion of the shaft is a cylindrical body having a substantially C-shaped cross-section.

12. The electromagnetic valve as in claim 11, wherein an inner hole is defined axially of the shaft,
    the substantially C-shaped cross section of the shaft defines a clearance opening, and
    said inner hole and said clearance opening define at least a part of a respiration passage connecting two chambers provided on both axial sides of the plunger.

13. An electromagnetic valve comprising:
    a valve device including a valve member capable of moving in an axial direction;
    an electromagnetic actuator including a coil, which generates a magnetic force when energized, a plunger, which moves in the axial direction, and a stator for leading the magnetic force generated by the coil to the plunger; and
    a shaft press-fit into at least one of the valve member and the plunger for transmitting the axial movement of the plunger to the valve member and for transmitting the axial movement of the valve member to the plunger, wherein
    the shaft has an inner hole and a radial opening defining at least a part of a respiration passage connecting two chambers provided on both axial sides of the plunger.

14. The electromagnetic valve as in claim 13, wherein at least the press-fit portion of the shaft is a cylindrical body having a substantially C-shaped cross-section, said C-shaped cross-section defining said radial opening.

15. The electromagnetic valve as in claim 14, wherein the shaft is cylindrical with a substantially C-shaped cross-section along an entire length thereof.

16. An electromagnetic valve comprising:

a valve device including a valve member capable of moving in an axial direction;

an electromagnetic actuator including a coil, which generates a magnetic force when energized, a plunger, which moves in the axial direction, and a stator for leading the magnetic force generated by the coil to the plunger; and a shaft press-fit into at least one of the valve member and the plunger for transmitting the axial movement of the plunger to the valve member and for transmitting the axial movement of the valve member to the plunger, wherein an inner hole is defined axially of the shaft, and at least the press-fit portion of the shaft has at least one longitudinal slit, said longitudinal slit defining a clearance opening that, together with said inner hole, defines at least a portion of a respiration passage connecting two chambers provided on both axial sides of the plunger.

* * * * *